(12) United States Patent
Onogi

(10) Patent No.: US 9,123,281 B2
(45) Date of Patent: Sep. 1, 2015

(54) LIGHTING APPARATUS HAVING A PLURALITY OF LIGHT SOURCES AND CONTROL METHOD THEREOF

(71) Applicant: CANON KABUSHIKI KAISHA, Tokyo (JP)

(72) Inventor: Makoto Onogi, Fujisawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 49 days.

(21) Appl. No.: 13/827,544

(22) Filed: Mar. 14, 2013

(65) Prior Publication Data

US 2013/0265348 A1 Oct. 10, 2013

(30) Foreign Application Priority Data

Apr. 6, 2012 (JP) ................................ 2012-087519
Jan. 30, 2013 (JP) ................................ 2013-015721

(51) Int. Cl.
  *G09G 5/10* (2006.01)
  *G09G 3/36* (2006.01)
  *G09G 3/34* (2006.01)

(52) U.S. Cl.
  CPC ............... *G09G 5/10* (2013.01); *G09G 3/3426* (2013.01); *G09G 2320/066* (2013.01); *G09G 2330/021* (2013.01); *G09G 2360/16* (2013.01); *Y02B 20/42* (2013.01)

(58) Field of Classification Search
  USPC ................. 345/87–89, 102.69, 691, 102, 690; 315/291–325
  See application file for complete search history.

(56) References Cited

U.S. PATENT DOCUMENTS

| 6,429,839 | B1 * | 8/2002 | Sakamoto | 345/87 |
| 8,274,470 | B2 * | 9/2012 | Seong et al. | 345/102 |
| 2010/0052564 | A1 * | 3/2010 | Park et al. | 315/291 |
| 2013/0082613 | A1 * | 4/2013 | Shin et al. | 315/186 |

FOREIGN PATENT DOCUMENTS

| JP | 2001-142409 A | 5/2001 |
| JP | 2009-188135 A | 8/2009 |
| JP | 2010-153359 A | 7/2010 |

OTHER PUBLICATIONS

The above reference was cited in a Feb. 10, 2015 Japanese Office Action, a copy of which is enclosed without an English Translation, that issued in Japanese Patent Application No. 2013-015721.

* cited by examiner

*Primary Examiner* — Rodney Amadiz
(74) *Attorney, Agent, or Firm* — Cowan, Liebowitz & Latman, P.C.

(57) ABSTRACT

A lighting apparatus for an image display apparatus is provided with: a plurality of light sources corresponding to a plurality of areas of a screen; and a control unit configured to control a duty ratio of a turn-on period and a turn-off period of each light source according to an image signal to be inputted, by carrying out pulse width modulation control on the turn-on periods of time and the turn-off periods of time of the plurality of light sources. In cases where the duty ratio of each light source is controlled according to the image signal to be inputted, the control unit regulates turn-on start timing of each light source in such a manner that a variation in the number of light sources which are turned on at the same time to be suppressed.

26 Claims, 16 Drawing Sheets

| AREA1 | AREA2 | AREA3 |
|---|---|---|
| AREA4 | AREA5 | AREA6 |
| AREA7 | AREA8 | AREA9 |
| AREA10 | AREA11 | AREA12 |

*Fig.2A*

| |
|---|
| AREA1 |
| AREA2 |
| AREA3 |
| AREA4 |
| AREA5 |
| AREA6 |
| AREA7 |
| AREA8 |
| AREA9 |
| AREA10 |
| AREA11 |
| AREA12 |

*Fig.2B*

| AREA1 | AREA2 | AREA3 |
|-------|-------|-------|
| AREA4 | AREA5 | AREA6 |
| AREA7 | AREA8 | AREA9 |
| AREA10 | AREA11 | AREA12 |

*Fig.4*

|  |  |  |
|---|---|---|
| AREA1 | AREA2 | AREA3 |
| AREA4 | AREA5 | AREA6 |
| AREA7 | AREA8 | AREA9 |
| AREA10 | AREA11 | AREA12 |

*Fig.6*

| AREA1 | AREA2 | AREA3 |
|---|---|---|
| AREA4 | AREA5 | AREA6 |
| AREA7 | AREA8 | AREA9 |
| AREA10 | AREA11 | AREA12 |

*Fig.10*

LIGHTING APPARATUS HAVING A PLURALITY OF LIGHT SOURCES AND CONTROL METHOD THEREOF

BACKGROUND OF THE INVENTION

1. Field of the Invention

The present invention relates to a lighting apparatus and a control method thereof.

2. Description of the Related Art

In recent years, image display apparatuses using liquid crystals are becoming mainstream. Because liquid crystal panels are not self-luminous devices, a backlight using light sources such as LEDs (Light-Emitting Diodes) is used. In addition, in liquid crystal displays, as methods for adjusting the brightness of an image, there are known a method of adjusting brightness by means of a liquid crystal, and a method of changing the brightness of a backlight. In order to enhance a contrast ratio within a screen, it is better to use a method of adjusting the highest brightness by means of a backlight. PWM (Pulse Width Modulation) is well used as a method of adjusting the brightness of the backlight. This method is to adjust the brightness of the backlight by turning it on and off at a fixed period or cycle and changing a ratio between a turn-on period and a turn-off period (a duty ratio) of the backlight. When the period or cycle of turn-on and turn-off is long, blinking of light will be recognized by human eyes, and so a viewer may feel a flicker. For that reason, it is general to turn the backlight on and off at a high frequency equal to or higher than 200 Hz.

The backlight using LEDs is covered with many LEDs. The number of LEDs used in the backlight varies according to the size, required brightness, etc., of a display screen. Here, let us assume that the screen can be divided into 12 areas, as shown in FIG. 2A and FIG. 2B, and that light emission control on the LEDs can be carried out for each of the areas. In FIG. 15, there is shown a change in an amount of electric current in the power supply of the backlight at the time of carrying out PWM control in which LEDs in all the areas are caused to turn on and off at the same timing. In FIG. 15, an axis of abscissa represents time, and an axis of ordinate represents the amount of electric current. A sum of amounts of electric currents in all the individual areas provides a total current. As shown in FIG. 15, when PWM control is carried out at the same timing in all the areas, a total amount of current will vary to a large extent depending on time, in one cycle of PWM. Thus, when the amount of electric current varies to a large extent, a reduction in power supply efficiency will be caused, leading to an increase in the electric power consumption. In addition, it is necessary to design the power supply of the backlight so as to be able to withstand large variation, which leads to high cost.

When a method of turning on the LEDs while shifting the timing (phase) of PWM for each area (see, for example, Japanese patent application laid-open No. 2010-153359) is used, it is possible to suppress a variation in the total amount of current.

However, in a liquid crystal display, when displaying black, the light of a backlight is shaded or shielded by closing a liquid crystal shutter. However, the shading or shielding of the light can not be done to a sufficient extent by means of the liquid crystal shutter, and even if the liquid crystal shutter is closed, a slight amount of light leaks therethrough, so that there may occur so-called "black floating" (misadjusted black level or graying of black) in which sufficient black expression is not able to be carried out. Accordingly, when the brightness of the backlight is controlled so as to be uniform over the full screen, a contrast ratio in the screen will be limited by the black floating. As a technology for eliminating this, there exists one called local dimming. This is a technology of carrying out control such that the brightness of the backlight is made different for each area in the screen according to the brightness and darkness of an image (see, for example, Japanese patent application laid-open No. 2001-142409). By carrying out local dimming, it becomes possible to suppress the black floating and to enhance the contrast ratio in the screen.

SUMMARY OF THE INVENTION

However, when the control of local dimming is carried out according to the brightness and darkness of an image, after having performed control to shift the timing of PWM for each area, as mentioned above, there will be a possibility that the amount of total current may vary to a large extent depending on the image. Thus, in the conventional technology, even if the timing of PWM is shifted for each area, incases where the duty ratio for each area is made to be variable by means of local dimming control, the width or range of variation of the total amount of current may become large. The variation in the total amount of current corresponds to a variation in the number of the areas to turn on within the duration of one cycle or period of PWM control. In cases where a large variation in the total amount of current occurs, it will lead to a rise in cost and an increase in the electric power consumption, as mentioned above.

Accordingly, the present invention is intended to provide a technique in which in a lighting apparatus having a plurality of light sources with their duty ratios capable of being changed independently of one another, it is possible to suppress a variation in supply power accompanying a change in the duty ratios.

A first aspect of the present invention resides in a lighting apparatus for an image display apparatus which comprises:

a plurality of light sources corresponding to a plurality of areas of a screen; and a control unit configured to control a duty ratio of a turn-on period and a turn-off period of each light source by carrying out pulse width modulation control on the turn-on periods of time and the turn-off periods of time of said plurality of light sources according to an image signal to be inputted;

wherein in cases where the duty ratio of each light source is controlled according to the image signal to be inputted, said control unit adjusts turn-on start timing of each light source in such a manner that a variation in the number of light sources which are turned on at the same time to be suppressed.

A second aspect of the present invention resides in a control method of a lighting apparatus for an image display apparatus which is provided with a plurality of light sources corresponding to a plurality of areas of a screen, said method comprising:

a step of inputting an image signal; and a control step of controlling a duty ratio of a turn-on period and a turn-off period of each light source by carrying out pulse width modulation control on the turn-on periods of time and the turn-off periods of time of said plurality of light sources according to an image signal inputted;

wherein in said control step, in cases where the duty ratio of each light source is controlled according to the image signal inputted, turn-on start timing of each light source is adjusted in such a manner that a variation in the number of light sources which are turned on at the same time to be suppressed.

According to the present invention, in a lighting apparatus having a plurality of light sources with their duty ratios capable of being changed independently of one another, it is possible to suppress a variation in supply power accompanying a change in the duty ratios.

Further features of the present invention will become apparent from the following description of exemplary embodiments with reference to the attached drawings.

BRIEF DESCRIPTION OF THE DRAWINGS

FIG. 2A is a view showing an example of area division of a backlight.

FIG. 2B is a view showing another example of area division of a backlight.

FIG. 4 is a view showing an example of a turn-on state for each area at the time of local dimming.

FIG. 6 is a view showing another example of a turn-on state for each area at the time of local dimming.

FIG. 10 is a view showing another example of a turn-on state for each area at the time of local dimming.

DESCRIPTION OF THE EMBODIMENTS (First Embodiment)

In the following, specific embodiments of the present invention will be described in detail, while referring to the accompanying drawings.

Figure 1:
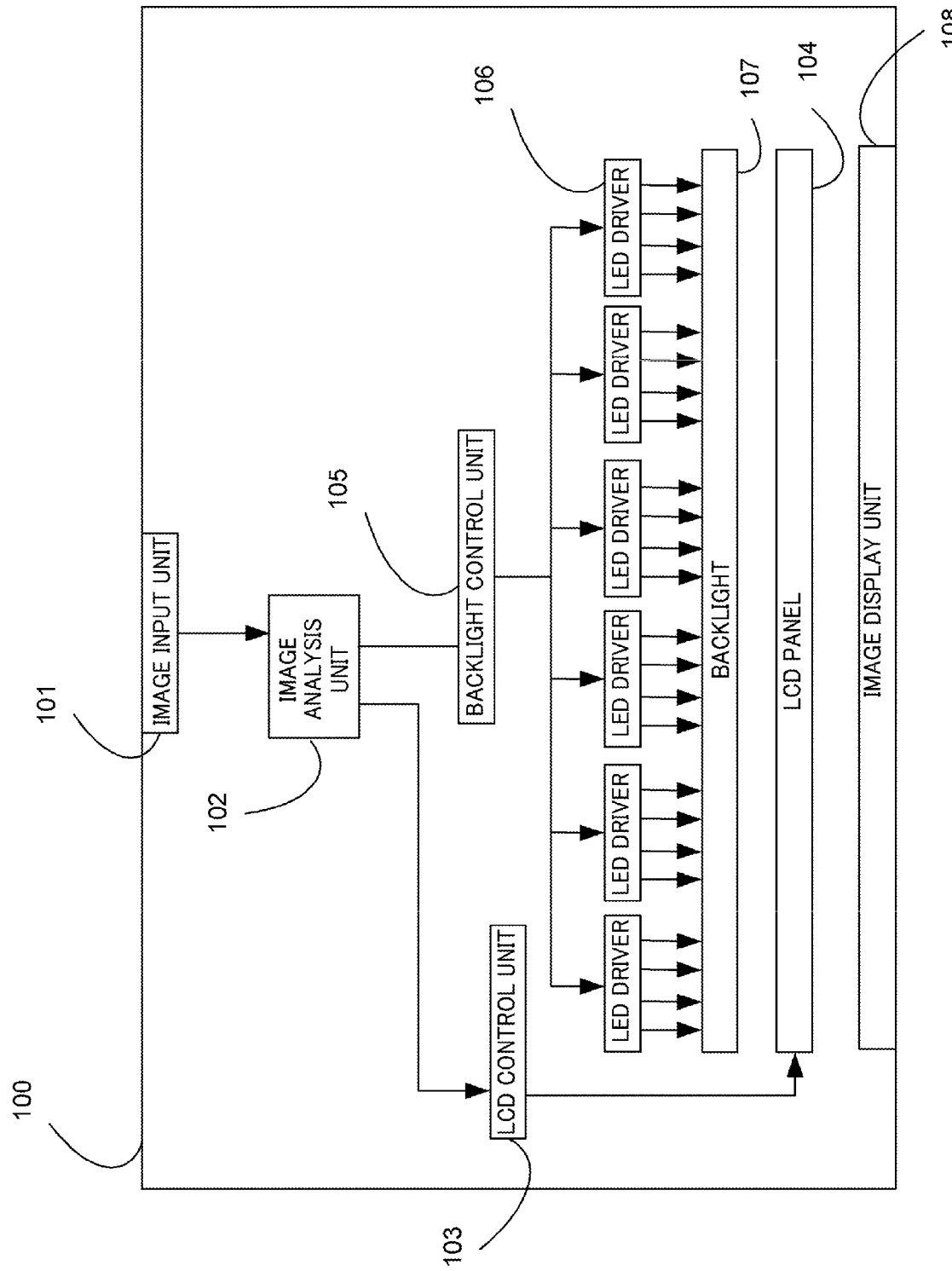
FIG. 1 is a block diagram showing the schematic construction of an image display apparatus according to a first embodiment of the present invention.

First, reference will be made to a first embodiment of the present invention. FIG. 1 is a block diagram showing the schematic construction of an image display apparatus 100 according to this first embodiment. The image display apparatus 100 includes an image analysis unit 102 which carries out an analysis on an image signal inputted from an image input unit 101. According to the result of the analysis in the image analysis unit 102, an LCD (Liquid Crystal Display) control unit 103 controls an LCD panel 104, so that a liquid crystal for each of pixels of an LCD is oriented into a state in which image display can be made. In addition, according to the analysis result of the image analysis unit 102, a backlight control unit 105 carries out settings such as current values, duty ratios (i.e., each ratio of a turn-on period to a turn-off period) of PWM control (pulse width modulation control), etc., necessary for LED drivers 106. The LED drivers 106 have a plurality of channels, and the individual channels are connected to LEDs, respectively, which are light sources constituting a backlight 107, wherein the LEDs are driven to turn on under the conditions set for each channel. When the backlight 107 irradiates or illuminates the LCD panel 104, an image is displayed on an image display unit 108.

In this embodiment, reference will be made to a case in which the entire region of the backlight 107 is divided into 12 areas in matrix form, as shown in FIG. 2A, so that the duty ratios of PWM and the turn-on timing (phase) of the backlight 107 can be controlled for each area. However, the present invention can also be applied to a case in which the entire region of the backlight 107 is divided into 12 areas in a vertical direction, as shown in FIG. 2B, so that the duty ratios of PWM and the turn-on timing (phase) of the backlight 107 can be controlled for each area. It is assumed that the 12 areas in FIG. 2A and FIG. 2B correspond to 12 areas obtained by dividing a screen of the image display unit 108. In order to decide the period or cycle of PWM, a PWM reference signal is generated per period of PWM by the backlight control unit 105. Here, a period from the generation of a PWM reference signal until the backlight 107 starts to turn on is defined as a delay time. The turn-on start timing of an LED within the duration of one cycle in PWM control is decided by the delay time. Accordingly, in this embodiment, to adjust the delay time of each LED means to adjust the turn-on start timing of each LED. This delay time can be set for each area. In this embodiment, in order to suppress the variation of a total current, it is possible to set a different delay time for each area. The variation in the total amount of current represents a variation in the number of areas being turned on at the same time within the duration of one cycle of PWM control. Here, note that the definition of the delay time is limited to the above-mentioned definition, but for example, the delay time may be defined as a period from the generation of a PWM reference signal until the backlight 107 is turned off, or it may also be defined as a period from the generation of a PWM reference signal to a midpoint or halfway point of the turn-on period.

Figure 3:
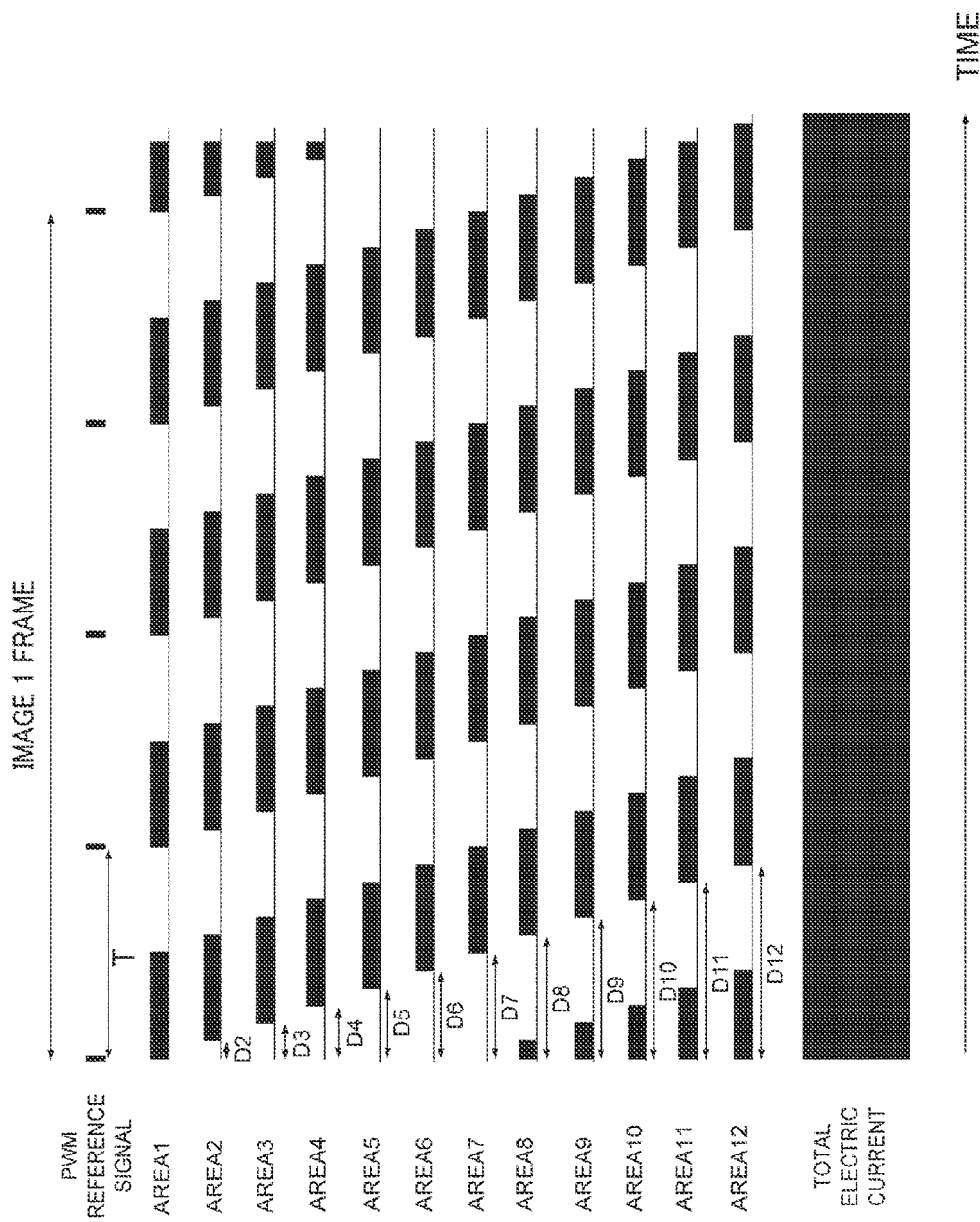
FIG. 3 is a view showing an example of setting of a delay time for each area.

FIG. 3 is a view showing an example of a change of an amount of electric current for each area in cases where a delay time is set for each area in such a manner that the delay time becomes longer in order of area numbers from an area 1. In FIG. 3, an axis of abscissa represents time, and an axis of ordinate represents the amount of electric current. In addition, a sum of amounts of electric currents in all the individual areas provides the total current. In cases where the PWM period is set to T, the delay time of each area shown in FIG. 3 is set as follows.

Delay time D1 of area 1=T×0/12 (D1=0 and hence not shown in FIG. 3)
Delay time D2 of area 2=T×1/12
Delay time D3 of area 3=T×2/12
Delay time D4 of area 4=T×3/12
Delay time D5 of area 5=T×4/12
Delay time D6 of area 6=T×5/12
Delay time D7 of area 7=T×6/12
Delay time D8 of area 8=T×7/12
Delay time D9 of area 9=T×8/12
Delay time D10 of area 10=T×9/12
Delay time D11 of area 11=T×10/12
Delay time D12 of area 12=T×11/12

Here, the case where the number of area divisions is 12 is explained as an example, but the number of area divisions is not limited to this example. In general, in cases where the number of area divisions is set to S, in order to make the delay times longer in order of area numbers, they should just be set as follows: the delay time of the N-th (N: 1, 2, ..., S) area DN=T×(N−1)/S. Thus, in this embodiment, the delay times (turn-on start timings) of the individual areas are decided by assigning a plurality of delay times (turn-on start timings) set in advance to the individual areas, respectively.

Figure 16:
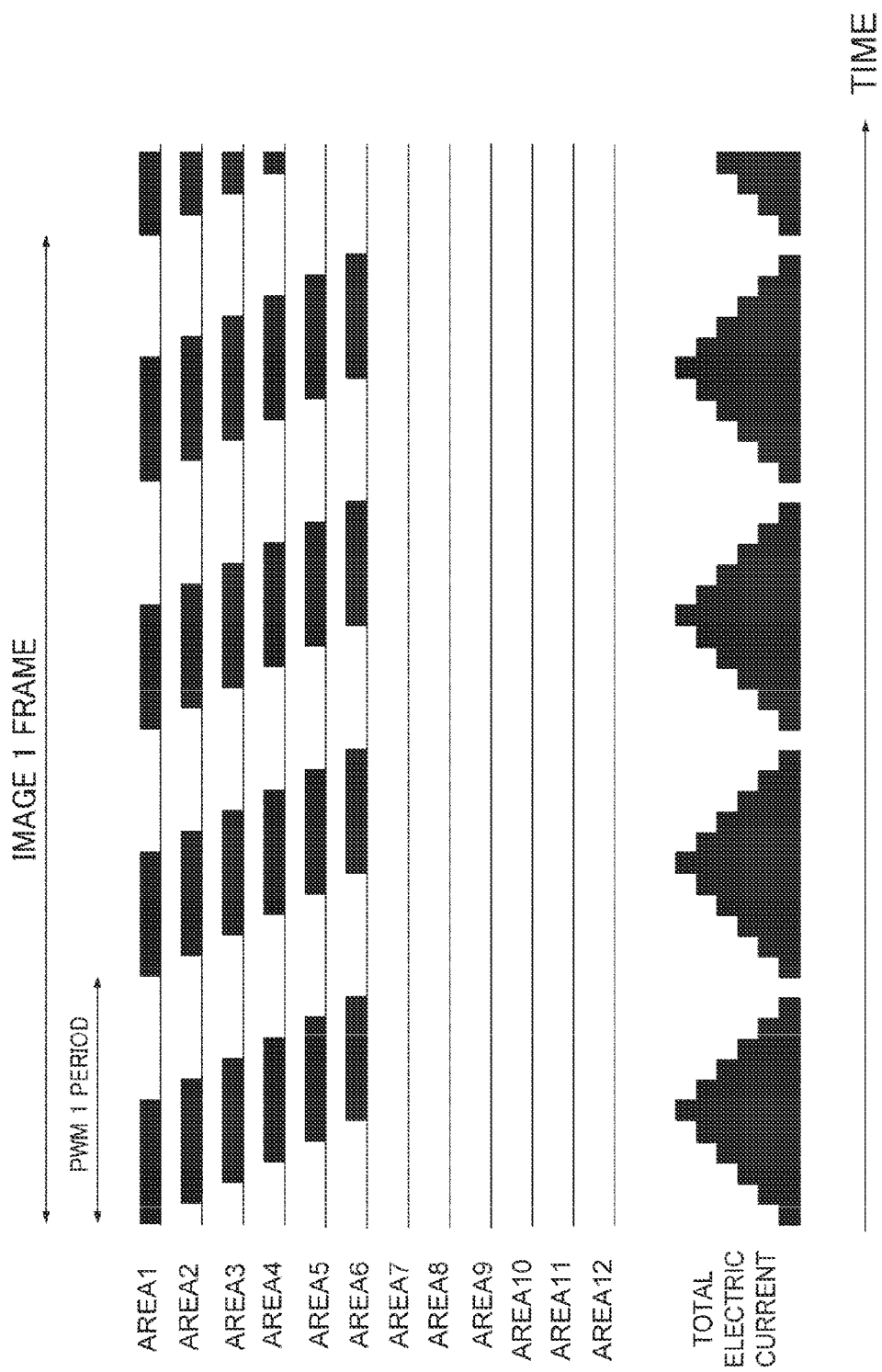
FIG. 16 shows another example in which a delay time for each area at the time of local dimming is fixed.

Here, as an example of local dimming, there is considered a case in which when a bright image is displayed in the areas 1 through 6 and a black image is displayed in the areas 7 through 12, the areas 1 through 6 are caused to turn on at a duty ratio of 50%, and the duty ratios of the areas 7 through 12 are all made to 0% so that they are turned off, as shown in FIG. 4. The duty ratio of each area is decided according to brightness (luminance) information (amount of brightness (luminance) characteristic) of the image of each area. Specifically, the image analysis unit 102 generates a brightness (luminance) histogram of the image displayed on each of the areas 1 through 12, and obtains a maximum brightness value of the image displayed in each area. However, an APL (Average Picture Level) as an average brightness value of the image displayed on each of the areas 1 through 12 may instead be obtained. According to the maximum brightness value of each area obtained by the image analysis unit 102, the backlight control unit 105 carries out settings such as current values, duty ratios (i.e., each ratio of the turn-on period to the turn-off period) of PWM control (pulse width modulation control), etc., necessary for the LED drivers 106. The backlight control unit 105 controls the backlight 107 in such a manner that the turn-on period of the backlight 107 is made longer for the areas where the maximum brightness value of the image is higher, and the turn-on period of the backlight 107 is made shorter for the areas where the maximum brightness value of the image is lower. In this case, when the delay time for each area is assigned in order of area numbers, as shown in FIG. 3, i.e., when the delay time for each area is fixed to the settings shown in FIG. 3, the total current will vary to a large extent, as shown in FIG. 16. FIG. 16 is a view showing an example in which when the control of local dimming is carried out according to the brightness and darkness of an image, the total amount of current will vary to a large extent. For example, it is assumed that the delay time for each area is fixed to the settings shown in FIG. 3, and the screen is divided into 12 areas which are lighted or turned on, while causing the phase for each area to shift with respect to one another, as shown in FIG. 2A and FIG. 2B. In cases where the brightness of the image corresponding to the areas 1 through 6 of the screen is high and the brightness of the image corresponding to the areas 7 through 12 is low, when a backlight portion of the areas 1 through 6 is caused to turn on and a backlight portion of the areas 7 through 12 is caused to turn off by means of the local dimming control, the width or range of the variation of the total amount of current may become large, as shown in FIG. 16.

Figure 5:
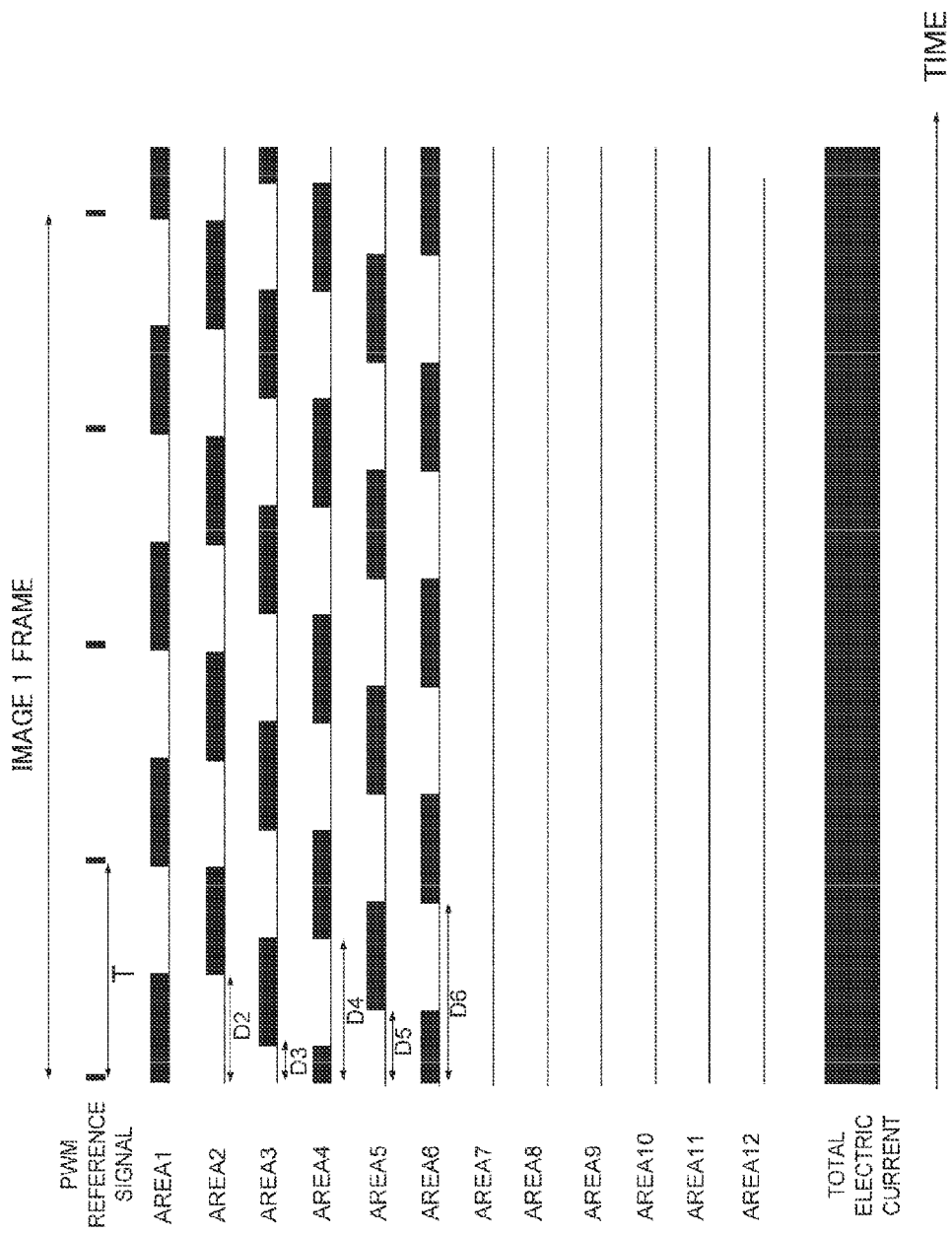
FIG. 5 is a view showing an example of a change of a delay time for each area at the time of local dimming.

On the other hand, by changing the delay times of some areas shown in FIG. 3 into those as shown in FIG. 5, it is possible to suppress a large variation of the total current. In an example of FIG. 5, the following changes have been made.

A change of the delay time D2 of the area 2 from (T×1/12) into (T×7/12).

A change of the delay time D4 of the area 4 from (T×3/12) into (T×9/12).

A change of the delay time D6 of the area 6 from (T×5/12) into (T×11/12).

Thus, it becomes possible to suppress the large variation of the total current by changing the delay time for each area in accordance with the change of the duty ratio for each area by the local dimming control in this manner.

Next, reference will be made to the control to change the delay time for each area for suppressing this variation of the total current, in generalized form. For example, in cases where the duty ratio is different for each area, the delay time of each area is set sequentially in order from the higher to the lower duty ratios of areas in the following manner.

T×0/12
T×6/12
T×9/12
T×3/12
T×5/12
T×11/12
T×8/12
T×2/12
T×4/12
T×10/12
T×7/12
T×1/12

This is a method of assigning the delay times in such a manner that the delay times of those areas in which the duty ratios are close to one another disperse as much as possible within one period or cycle of PWM. That is, the assignment of the delay times is carried out in such a manner that the turn-on start timings, in those areas in which their duty ratios are mutually equal to each other, or in which a difference between their duty ratios is within a threshold value, are apart from each other. Thus, it becomes possible to suppress the large variation of the total current by dispersing the delay times of the areas with mutually close duty ratios in this manner. In addition, in this embodiment, it is assumed that in cases where the duty ratios of a plurality of areas are the same with each other, the delay times of these areas are set sequentially in order from the smaller area number to the larger area number. The above is an example of settings of the delay times in the case of the number of area divisions being 12. In cases where the number of area divisions is other than 12, too, the delay time of each area should just be assigned in such a manner that the delay times of those areas in which the duty ratios are close to one another disperse as much as possible within one period or cycle of PWM.

Figure 7:
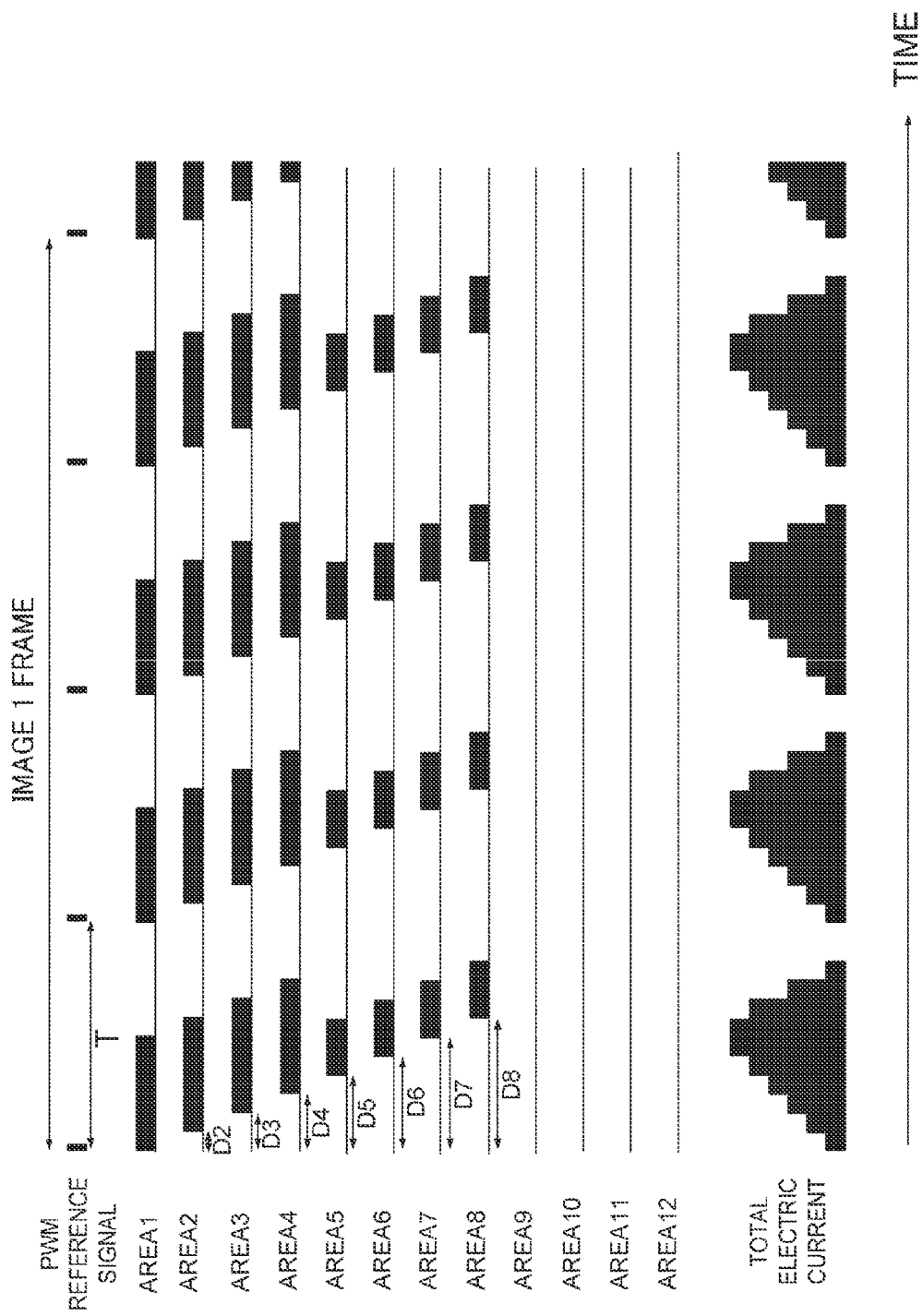
FIG. 7 is a view showing an example in which a delay time for each area at the time of local dimming is fixed.

Here, let us consider a turn-on state of the backlight 107 in which the duty ratios of the areas 1 through 4 are 50%, the duty ratios of the areas 5 through 8 are 25%, and the duty ratios of the areas 9 through 12 are 0%, as shown in FIG. 6. In this case, when the delay time for each area is fixed in a setting in which the delay times become longer in order of area numbers from area 1, as shown in FIG. 3, the total current will vary to a large extent, as shown in FIG. 7.

Figure 8:
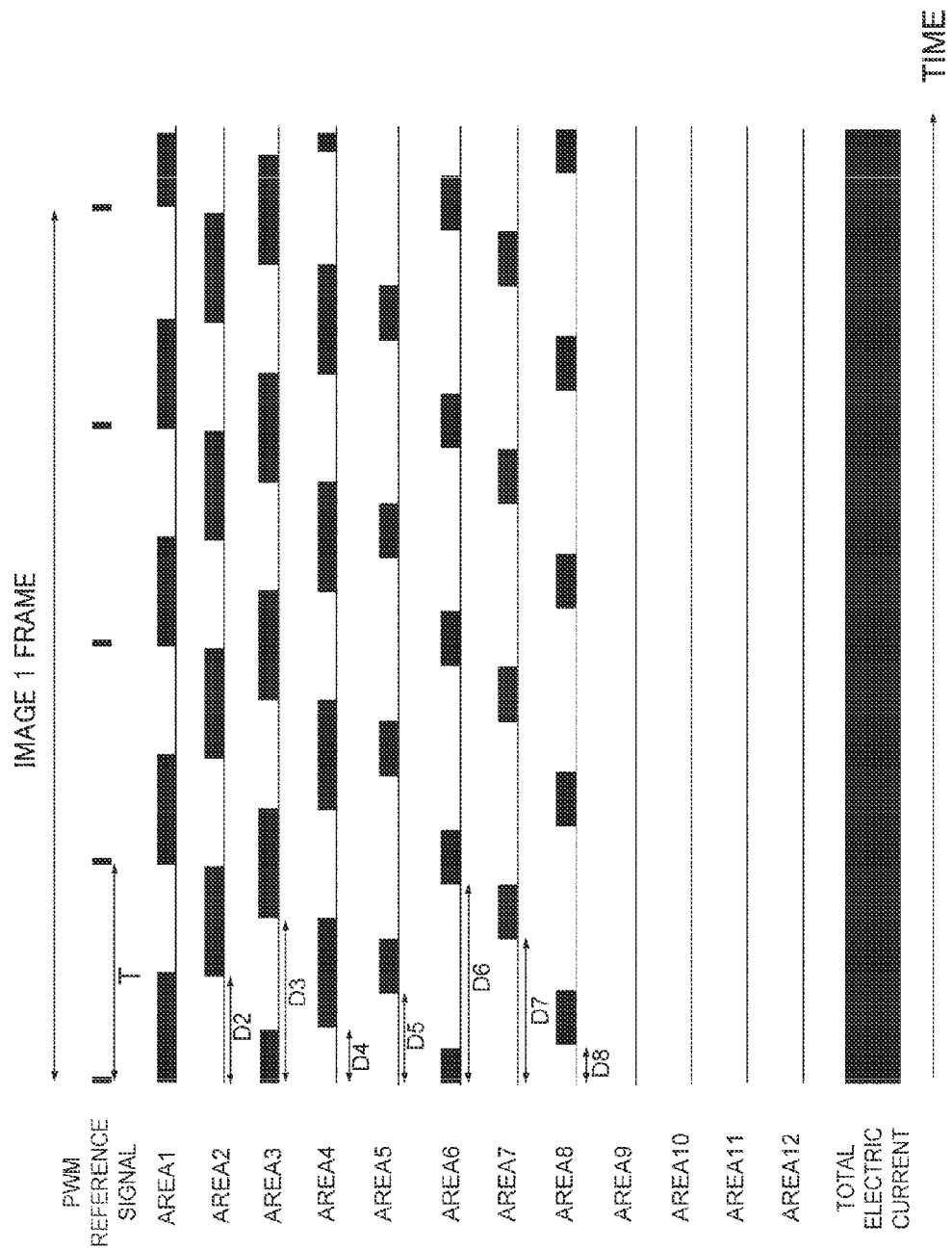
FIG. 8 is a view showing another example of a change of a delay time for each area at the time of local dimming.

On the other hand, in this embodiment, as shown in FIG. 8, the delay time for each area is changed according to the duty ratio thereof. That is, in this embodiment, the entire areas are grouped in such a manner that those areas in which their duty ratios are mutually equal to one another, or in which the difference between the duty ratios is within the threshold value, belong to the same group. Then, the delay time of each area is adjusted so that the turn-on start timings of those areas which belong to the same group are apart from each other as much as possible. Here, the image display apparatus 100 groups the areas 1 through 4 of which the duty ratio is the highest into the same group, and sets the delay times of these four areas 1 through 4 which belong to this group in the following manner.

Delay time D1 of area 1=T×0/12 (D1=0 and hence not shown in FIG. 8)

Delay time D2 of area 2=T×6/12

Delay time D3 of area 3=T×9/12

Delay time D4 of area 4=T×3/12

In addition, the image display apparatus 100 groups the areas 5 through 8 of which the duty ratio is the second highest into the same group, and sets the delay times of these four areas 5 through 8 which belong to this group in the following manner.

Delay time D5 of area 5=T×5/12
Delay time D6 of area 6=T×11/12
Delay time D7 of area 7=T×8/12
Delay time D8 of area 8=T×2/12

Moreover, the duty ratios of the areas 9 through 12 are 0%, so the setting of the delay times of the areas 9 through 12 is unnecessary, but the image display apparatus 100 may group the areas 9 through 12 into the same group, and may set the delay times of these four areas 9 through 12 which belong to this group in the following manner. Here, note that the turn-on periods of time for the areas 9 through 12 are 0, and hence the delay times of these areas are not illustrated in FIG. 8.

Delay time D9 of area 9=T×4/12
Delay time D10 of area 10=T×10/12
Delay time D11 of area 11=T×7/12
Delay time D12 of area 12=T×1/12

By setting the delay time for each area in this manner, it becomes possible to suppress the large variation of the total current, as shown in FIG. 8.

Figure 9:
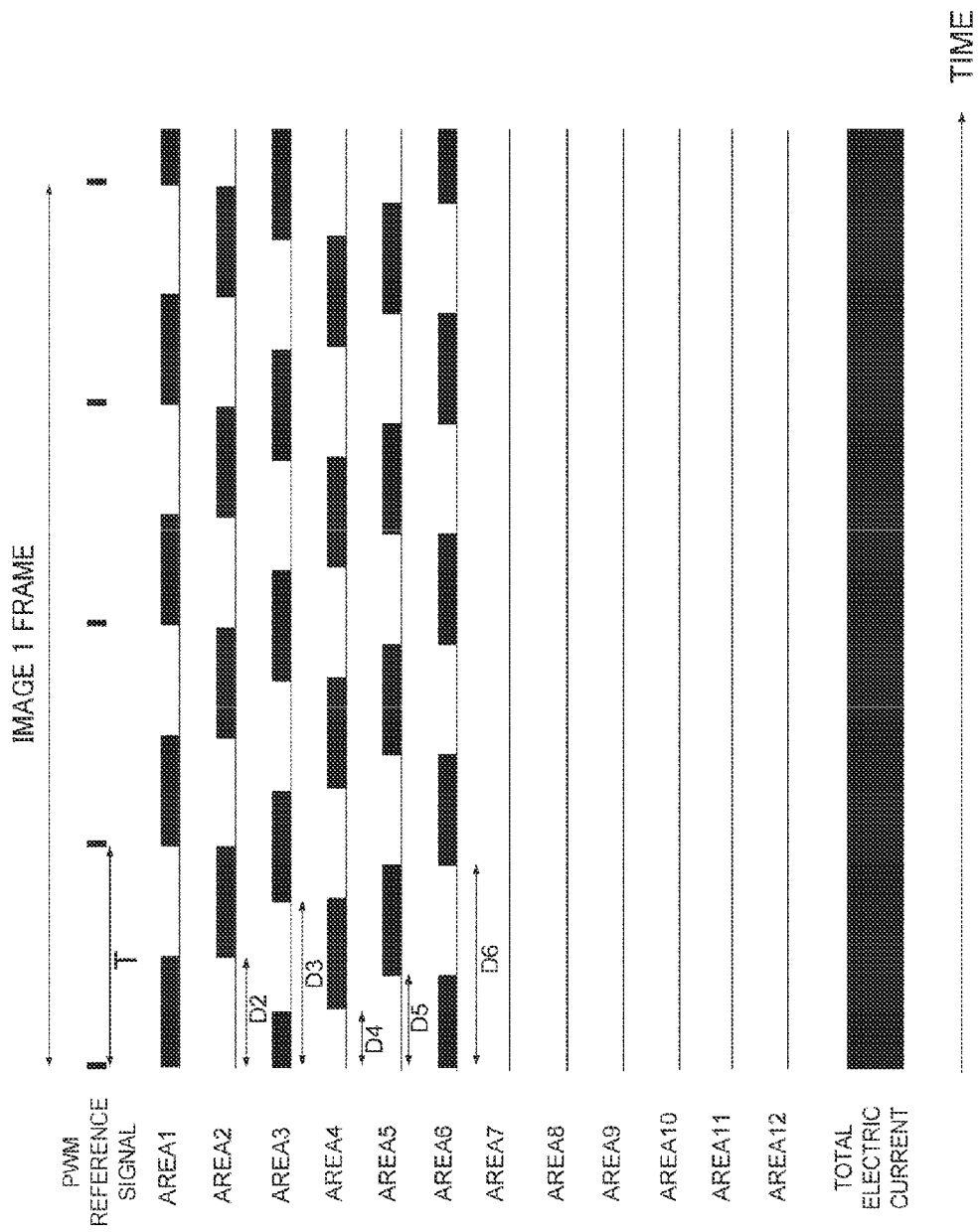
FIG. 9 is a view showing another example of a change of a delay time for each area at the time of local dimming.

In cases where the above-mentioned setting method for the delay times is applied to a turn-on or lighted state of FIG. 4, a change in the amount of electric current for each area becomes as shown in FIG. 9. That is, the delay times of the areas 1 through 6 of which the duty ratio is 50% are set in order of area numbers in the following manner.

Delay time D1 of area 1=T×0/12
Delay time D2 of area 2=T×6/12
Delay time D3 of area 3=T×9/12
Delay time D4 of area 4=T×3/12
Delay time D5 of area 5=T×5/12
Delay time D6 of area 6=T×11/12

By setting the delay times in this manner, it is possible to suppress the width or range of the variation of the total amount of current from becoming large, as in the case of FIG. 5.

Figure 11:
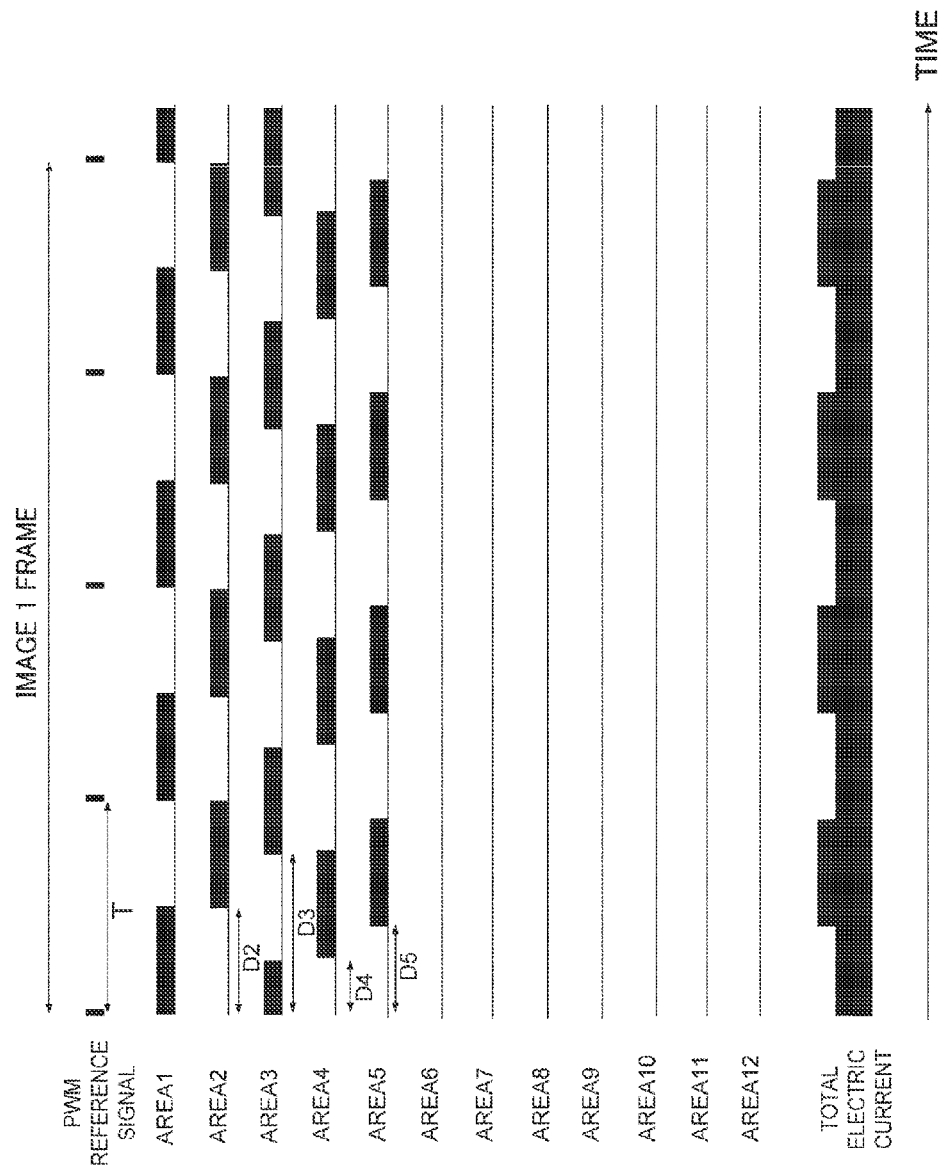
FIG. 11 is a view showing another example of a change of a delay time for each area at the time of local dimming.

On the other hand, it can be considered that even if the above-mentioned setting method for the delay times is applied, the range of the variation of the total current may also become large, depending on the duty ratio for each area. For example, in cases where the areas 1 through 5 are caused to light or turn on at a duty ratio of 50%, and at the same time, the duty ratios of the areas 6 through 12 are made to 0% so that they are turned off, as shown in FIG. 10, when the delay time of each area is changed by means of the above-mentioned setting method for the delay times, the result is as shown in FIG. 11, thus giving rise to a variation in the total current. However, as compared with the example shown in FIG. 7 or FIG. 16, the range of the variation of the total current is small. In addition, by increasing the number of area divisions thereby to increase the number (kind) of settings of the delay times, it becomes possible to make smaller the range of the variation of the total current. Moreover, in this embodiment, an example has been described in which all the different delay times are set for individual areas, respectively, but it is not necessary to necessarily make the delay times different from one another in all the areas. Further, in this embodiment, a method has been described in which on the assumption that the backlight is driven by one power supply, the delay time for each area is decided so as to suppress the variation of the total current of the one power supply. However, in the case of driving the backlight by means of a plurality of power supplies, the delay time for each area is set in such a manner that the variation of the total current can be suppressed for each power supply.

As described above, when local dimming control is carried out by applying the control method of the backlight shown in this embodiment, too, it is possible to suppress a large variation of supply power in the power supply (a total amount of current flowing to the LEDs of the backlight) which carries out the supply of electric power to the backlight. Accordingly, it becomes possible to attain a power supply design in which power efficiency is high and the cost is suppressed, thus making it possible to achieve low power consumption and low cost.

(Second Embodiment)

In this second embodiment, reference will be made to control at the time when the duty ratio of PWM of the backlight for each area is changed or switched over in accordance with a temporal change of an image, in cases where the image such as a dynamic or moving image changes in the passage of time. The backlight control of this second embodiment will be explained by taking as an example the case where a change or switch is made from an image in which the entire area of the backlight is turned on at a duty ratio of 50%, as shown in FIG. 2A, to an image in which the duty ratio of the backlight changes according to the areas thereof, as shown in FIG. 6. In the changing or switching of an image, in the case of a liquid crystal panel, the pixel value of each pixel of liquid crystal is switched from an upper portion of a screen toward a lower portion of the screen in a sequential manner in the time of one frame (e.g., 1/60 seconds). In cases where a reference signal for one frame of the image is set to VSYNC, when the duty ratios of the backlight in all the areas are changed all at once according to VSYNC, the brightness of the backlight will change before the liquid crystal at the lower portion of the screen is switched. In order to avoid that, in this embodiment, the duty ratios are changed between a VSYNC and the following VSYNC in a sequential manner from an area of a backlight upper portion in accordance with the switching of the liquid crystal.

Figure 12:
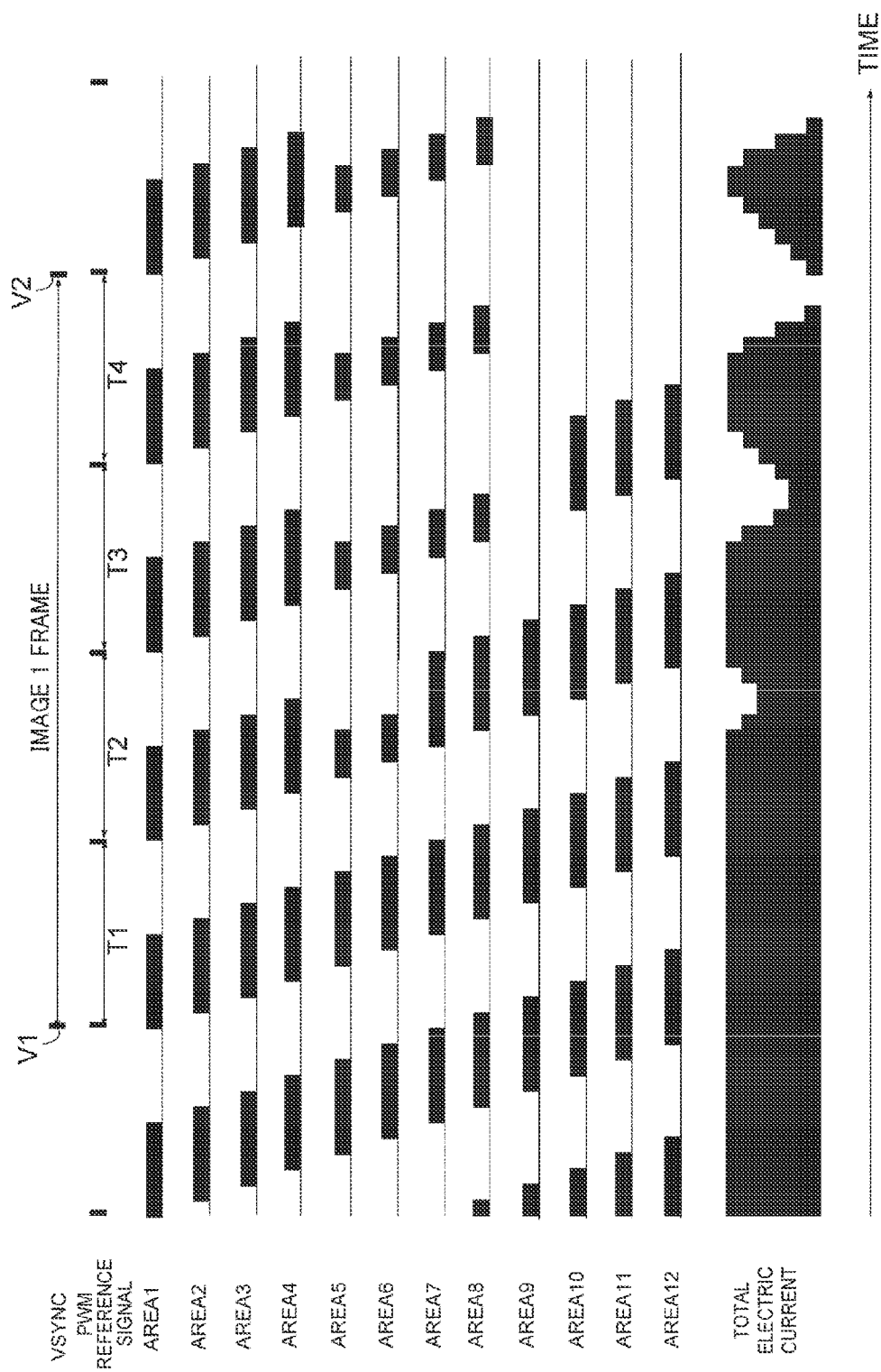
FIG. 12 is a view showing an example in which a delay time for each area at the time of changing an image is fixed.

FIG. 12 shows a change of the amount of electric current in each area of the backlight at the time of changing or switching of an image in cases where the delay time of each area is fixed. As will be described later, in cases where the delay time of each area is fixed, the range of the variation of the total current may become large, as explained by using FIG. 7 in the conventional technology and the first embodiment.

In FIG. 12, it is assumed that a period from V1, which is a VSYNC of the first frame, to V2, which is a VSYNC of the following second frame is a length for four periods or cycles of the PWM control of the backlight. It is also assumed that this period for the four periods of the PWM control is represented by T1 for the first period starting from V1, and by T2, T3 and T4 for the following second, third and fourth period, respectively. It is further assumed that the turned-on state of the backlight corresponding to an image of a frame preceding the first frame is the turn-on state shown in FIG. 2A, and the turn-on state of the backlight corresponding to an image of the first frame is the turn-on state shown in FIG. 6. In one frame period of an image, there exist four PWM periods, and so the change of the duty ratios of the backlight is carried out four times.

First, in the duration of the first PWM period T1, the duty ratios of the backlight of the areas 1 through 3 are changed. However, in the change from FIG. 2A to FIG. 6, there is no change of the duty ratio in these areas accompanying the change of the image, and hence, in actuality, the change of the duty ratio is not carried out.

In the duration of the following second PWM period T2, the duty ratios of the backlight of the areas 4 through 6 are changed. With respect to the area 4, the change of the duty ratio is not carried out, as in the case of the areas 1 through 3, but the duty ratios of the areas 5 and 6 are both changed from 50% to 25%.

In the duration of the following third PWM period T3, the duty ratios of the backlight of the areas 7 through 9 are changed. In the areas 7 and 8, the duty ratios thereof are changed from 50% to 25%, and in the area 9, the duty ratio thereof is changed from 50% to 0%.

In the duration of the last or fourth PWM period T4, the duty ratios of the backlight of the areas 10 through 12 are all changed from 50% to 0%. When there is no change of the image in the frame after V2, there is no need to change the duty ratios in the following PWM period. On the other hand, when the image has further changed in the frame after V2, the duty ratios of the twelve areas 1 through 12 is similarly changed in a sequential manner, over the duration of one VSYNC period (four periods of PWM control). Note that here, in order to simplify the description, the timing of VSYNC and the timing of the first PWM reference signal in the period T1 are made the same, but it can also be considered that for the purpose of optimization of the turn-on start timing of the backlight, the PWM reference signal is delayed with respect to VSYNC.

Figure 13:
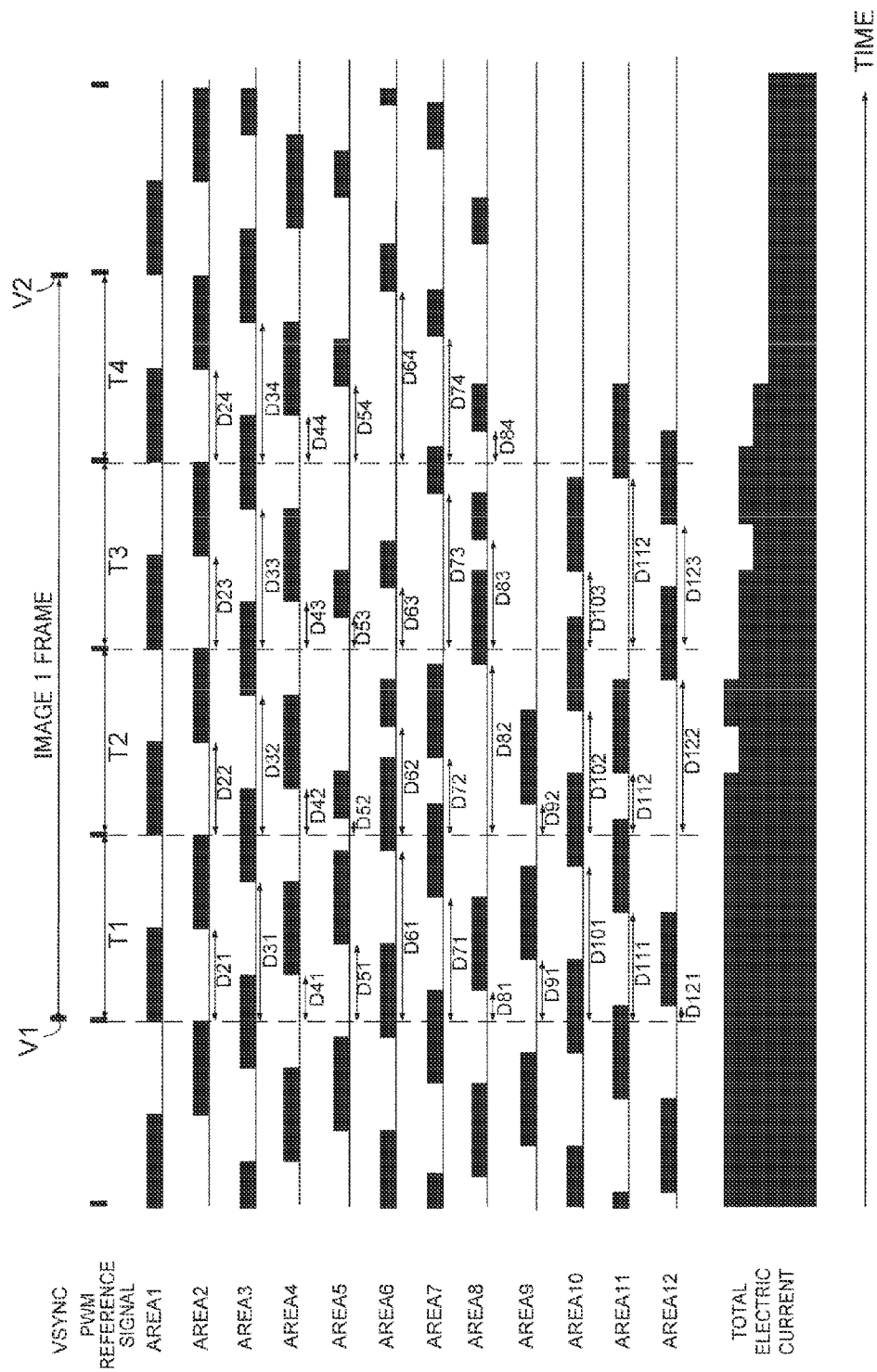
FIG. 13 is a view showing an example in which a delay time for each area at the time of changing an image is changed.

As shown in FIG. 12, in cases where the delay time for each area is fixed, the way of the variation of the total current changes for each period of PWM in accordance with a change of the image. For that reason, depending on a change of the duty ratio of each area of the backlight in accordance with the image switching, a large variation may occur in the total current, as shown in FIG. 12. In this embodiment, in order to suppress such a large variation of the total current, the control to change the delay time of each area for each period of PWM is carried out, upon switching of the image. FIG. 13 is a view showing an example of the change of the amount of electric current in cases where the delay time of each area is changed for each period of PWM, at the time of switching of the image.

In the period T1, which is a PWM period immediately after the V1 signal, the duty ratios of all the areas are 50%, and there is no difference in the duty ratios depending on the areas, and hence, the image display apparatus sets the delay time for each area in the following manner in accordance with the order of setting of the delay times shown in the first embodiment.

Delay time D11 of area 1=T×0/12 (D11=0 and hence not shown in FIG. 13)
Delay time D21 of area 2=T×6/12
Delay time D31 of area 3=T×9/12
Delay time D41 of area 4=T×3/12
Delay time D51 of area 5=T×5/12
Delay time D61 of area 6=T×11/12
Delay time D71 of area 7=T×8/12
Delay time D81 of area 8=T×2/12
Delay time D91 of area 9=T×4/12
Delay time D101 of area 10=T×10/12
Delay time D111 of area 11=T×7/12
Delay time D121 of area 12=T×1/12

In the following period T2, the duty ratios of the area 5 and the area 6 are both changed from 50% to 25%. That is, the duty ratios of ten areas consisting of the areas 1 through 4 and 7 through 12 are 50%, and the duty ratios of two areas consisting of the areas 5 and 6 are 25%. Accordingly, the image display apparatus sets the delay time for each area sequentially according to the setting order shown in the first embodiment preferentially from the area of the higher duty ratio in the following manner so that the turn-on start timings are mutually apart from each other as much as possible.

Delay time D12 of area 1=T×0/12 (D12=0 and hence not shown in FIG. 13)
Delay time D22 of area 2=T×6/12
Delay time D32 of area 3=T×9/12
Delay time D42 of area 4=T×3/12
Delay time D72 of area 7=T×5/12
Delay time D82 of area 8=T×11/12
Delay time D92 of area 9=T×8/12
Delay time D102 of area 10=T×2/12
Delay time D112 of area 11=T×4/12
Delay time D122 of area 12=T×10/12
Delay time D52 of area 5=T×7/12
Delay time D62 of area 6=T×1/12

Figure 14:
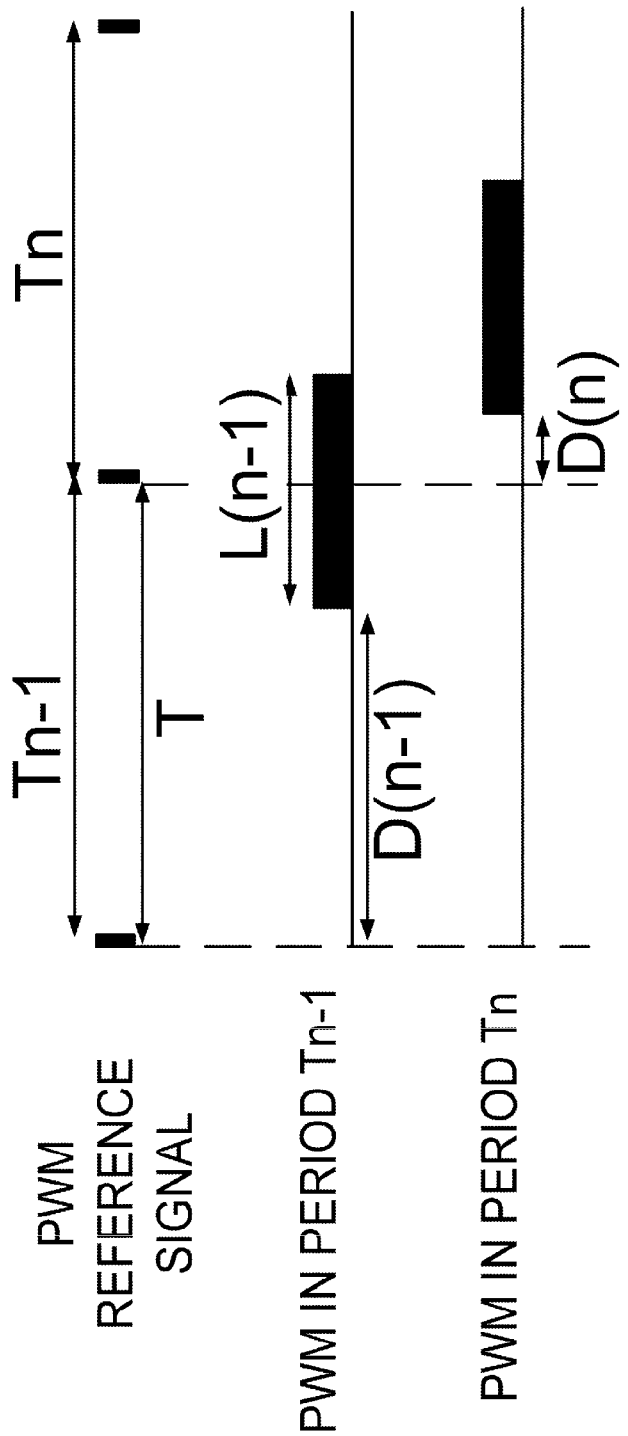
FIG. 14 is a view in cases where turn-on periods of time in PWM periods before and after a change of a delay time overlap with each other due to the change of the delay time.
Figure 15:
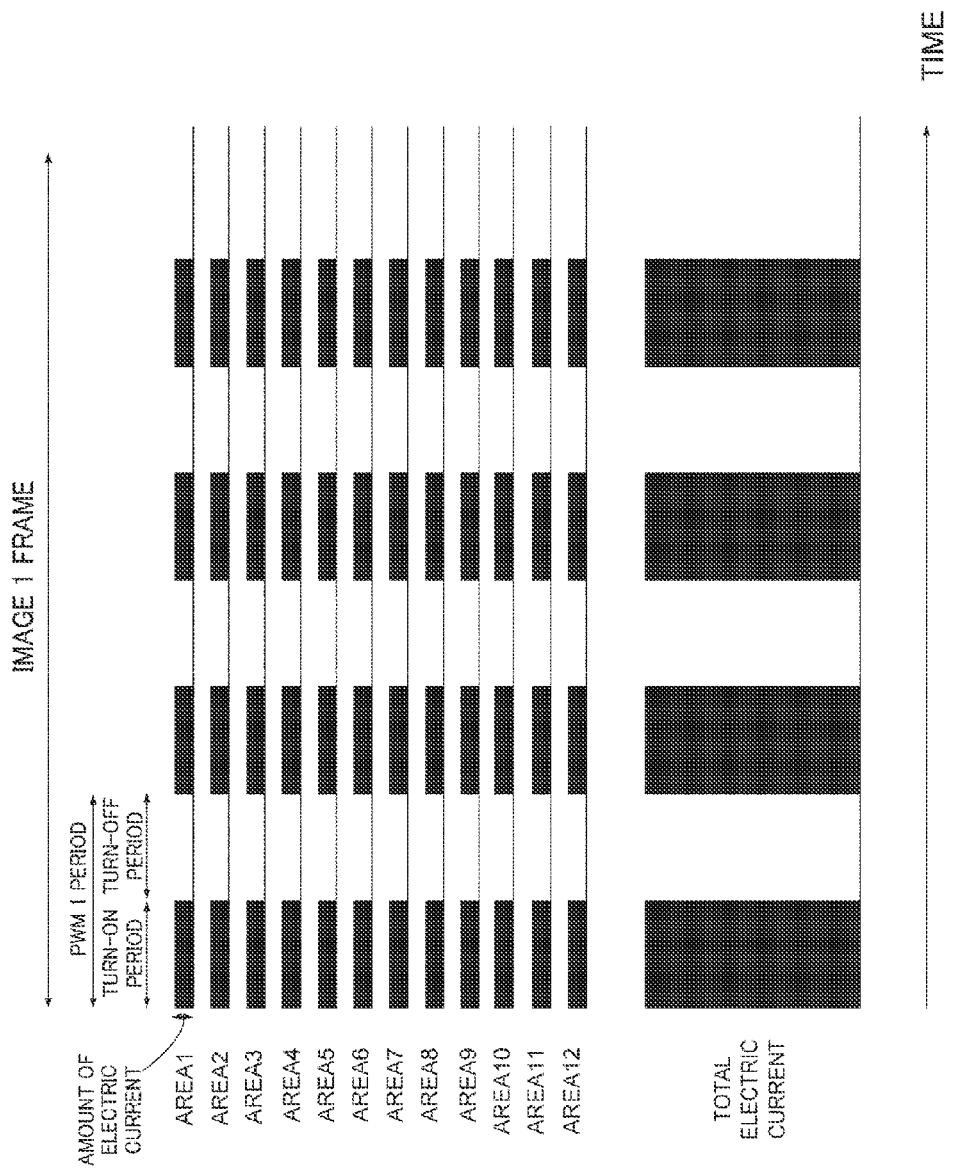
FIG. 15 is a view showing an example in which a delay time for each area is fixed.

However, the delay time D61 in the period T1 of the area 6 is (T×11/12), and the duty ratio in the period T1 is 50%. For that reason, the turn-on period of a duration (T×6/12) corresponding to the duty ratio of 50%, which is started after the lapse of the delay time D61 in the period T1, has not yet expired at a point in time at which the delay time D62 in the period T2 has elapsed. Accordingly, the turn-on period in the period T2 will overlap with the turn-on period in the preceding PWM period T1. Processing or handling in such a case will be described below by the use of FIG. 14. In FIG. 14, let us assume that the delay time in the last (or one preceding) period Tn−1 is denoted by D(n−1); the delay time in the current period Tn is denoted by D(n); the turn-on period in the one preceding period is denoted by L(n−1); and the PWM period is denoted by T. At this time, in cases where the following condition A is satisfied, $$D(n-1)+L(n-1)>T+D(n) \qquad \text{Condition A}$$

the turn-on period in the current PWM period will overlap in part with the turn-on period in the one preceding PWM period T1. For that reason, in this embodiment, the delay time of an area which satisfies the above-mentioned condition A is replaced with the delay time of another area. As explained in the first embodiment, in the delay time setting method of this embodiment, the delay time for each area is set in such a manner that the delay times of those areas of which the duty ratios are mutually the same with or close to each other are dispersed from each other. Accordingly, in this embodiment, with respect to one area which satisfies the condition A, the delay time thereof is exchanged with that of another area of which the duty ratio is the same with or close to that of the one area. As a result of this, the delay time of the area which satisfies the condition A will change to a large extent, so it is possible to suppress an overlap between the turn-on period in the one preceding period and the turn-on period in the current period in that area. Besides, the effect of suppressing a large variation of the total current does not change a lot.

In the example of FIG. 13, the area 6 satisfies the condition A, so the image display apparatus exchanges the delay time of the area 6 with the delay time of the area 5 of which the duty ratio is close to that of the area 6, and sets them as follows.

Delay time D52 of area 5=T×1/12
Delay time D62 of area 6=T×7/12

By carrying out the settings in this manner, it is possible to prevent the turn-on period in the period T1 and the turn-on period in the period T2, in both the area 6 and the area 5, from overlapping with each other. In addition, even in cases where such an exchange of the delay times is carried out, no large influence is exerted on the effect of suppressing the range of the variation of the total current, as shown in FIG. 13.

Similarly, when the condition A is satisfied for the area 10, too, and the delay time of the area 10 is to be set as D102=T× 2/12, as mentioned above, the turn-on period in the last or preceding PWM period T1 and the turn-on period in the PWM period T2 will overlap with each other. Accordingly, the image display apparatus exchanges the delay time of the area 10 with the delay time of the area 9, and sets them as follows.

Delay time D92 of area 9=T×2/12
Delay time D102 of area 10=T×8/12

In the following third PWM period T3, the duty ratios of the areas 7 through 9 are changed. That is, the duty ratios of the areas 7, 8 are both changed from 50% to 25%, and the duty ratio of the area 9 is changed from 50% to 0%. As a result, the duty ratios of seven areas consisting of the areas 1 through 4 and the areas 10 through 12 become 50%, and the duty ratios of four areas consisting of the areas 5 through 8 become 25%, and the duty ratio of the area 9 becomes 0%. Accordingly, the image display apparatus sets the delay time for each area sequentially according to the setting order shown in the first embodiment preferentially from the area of the higher duty ratio in the following manner. Here, note that in the following settings, there is no area which satisfies the condition A, so there is no need to carry out the above-mentioned exchange of the delay times.

Delay time D13 of area 1=T×0/12 (D13=0 and hence not shown in FIG. 13)
Delay time D23 of area 2=T×6/12
Delay time D33 of area 3=T×9/12
Delay time D44 of area 4=T×3/12
Delay time D103 of area 10=T×5/12
Delay time D113 of area 11=T×11/12
Delay time D123 of area 12=T×8/12
Delay time D53 of area 5=T×2/12
Delay time D63 of area 6=T×4/12
Delay time D73 of area 7=T×10/12
Delay time D83 of area 8=T×7/12
Delay time D93 of area 9=T×1/12 (the duty ratio is 0% and hence not shown in FIG. 13)

In the following fourth PWM period T4, the duty ratios of the areas 10 through 12 are changed. That is, the duty ratios of the areas 10 through 12 are changed from 50% to 0%. As a result, the duty ratios of the areas 1 through 4 become 50%, the duty ratios of the areas 5 through 8 become 25%, the duty ratios of the areas 9 through 12 become 0%. Accordingly, the image display apparatus sets the delay time for each area sequentially according to the setting order shown in the first embodiment preferentially from the area of the higher duty ratio in the following manner. Here, note that in the following settings, there is no area which satisfies the condition A, so there is no need to carry out the above-mentioned exchange of the delay times.

Delay time D14 of area 1=T×0/12 (D14=0 and hence not shown in FIG. 13)
Delay time D24 of area 2=T×6/12
Delay time D34 of area 3=T×9/12
Delay time D44 of area 4=T×3/12
Delay time D54 of area 5=T×5/12
Delay time D64 of area 6=T×11/12
Delay time D74 of area 7=T×8/12
Delay time D84 of area 8=T×2/12
Delay time D94 of area 9=T×4/12 (the duty ratio is 0% and hence not shown in FIG. 13)
Delay time D104 of area 10=T×10/12 (the duty ratio is 0% and hence not shown in FIG. 13)
Delay time D114 of area 11=T×7/12 (the duty ratio is 0% and hence not shown in FIG. 13)
Delay time D124 of area 12=T×1/12 (the duty ratio is 0% and hence not shown in FIG. 13)

By carrying out the above settings, even in cases where the duty ratio for each area changes with the local dimming control according to a change of the image, it is possible to suppress a large variation of the total amount of current, as shown in FIG. 13. As a result, it becomes possible to attain a power supply design in which power efficiency is high and the cost is suppressed, thus making it possible to achieve low power consumption and low cost.

Although in the above-mentioned embodiments, examples have been described in which the present invention is applied to a backlight for an image display apparatus using LEDs as light sources, the scope of the present invention is not limited to this. For example, organic EL (Electro-Luminescence) light emitting devices may be used as light sources. In addition, the present invention can also be applied to a lighting apparatus other than a backlight apparatus of an image display apparatus, wherein the lighting apparatus is provided with a plurality of light sources, and an amount of light emission of each light source is subjected to pulse width modulation control in such a manner that the duty ratio and the turn-on start timing of each light source can be changed for each period of pulse width modulation control. Moreover, in the above-mentioned embodiments, an example has been described in which a plurality of light sources are grouped in such a manner that light sources with their duty ratios being mutually equal to one another belong to the same group, and the turn-on timings of the light sources belonging to the same group are apart from one another as much as possible. However, a plurality of light sources may be grouped in such a manner that light sources with their duty ratios being close to one another, i.e., light sources in which a difference between the duty ratios thereof is equal to or less than a threshold value, belong to the same group. For example, in cases where there are a lot of levels (kinds of duty ratios) of brightness adjustment for each light source (e.g., in cases where brightness can be adjusted in 21 levels, i.e., in increments of 5%, etc.), light sources may be grouped in such a manner that those light sources which have mutually close duty ratios (e.g., 100%, 95%, 90%) belong to the same group. Then, the turn-on start timings may be adjusted so that the turn-on start timings are apart from each other as much as possible, while giving priority to groups of light sources with large duty ratios.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-087519, filed on Apr. 6, 2012, and Japanese Patent Application No. 2013-015721, filed on Jan. 30, 2013, which are hereby incorporated by reference herein in their entirety.

What is claimed is:

1. A lighting apparatus for an image display apparatus comprising:
   a plurality of light sources corresponding to a plurality of areas of a screen; and
   a control unit configured to control a duty ratio of a turn-on period and a turn-off period of each light source by carrying out pulse width modulation control on the turn-on periods and the turn-off periods of said plurality of light sources according to an image signal to be inputted;

wherein in cases where the duty ratio of each light source is controlled according to the image signal to be inputted, said control unit adjusts turn-on timing of each light source in such a manner that a variation in the number of light sources which are in turn-on state on at the same time is suppressed, and said control unit groups said plurality of light sources in such a manner that light sources with their duty ratios being mutually equal to one another or with a difference between their duty ratios being within a threshold value belong to a same group, and adjusts the turn-on timing of each light source in such a manner that the turn-on timings of the light sources belonging to the same group are apart from one another.

2. The lighting apparatus as set forth in claim 1, wherein said control unit adjusts the turn-on timings of the individual light sources by assigning a plurality of turn-on timings set in advance to the individual light sources, respectively, and assigns the turn-on timings preferentially from a group of light sources with large duty ratios in such a manner that the turn-on timings of the light sources belonging to the same group are apart from one another.

3. The lighting apparatus as set forth in claim 1, wherein said control unit controls the duty ratio of each light source according to an amount of brightness characteristic of an image corresponding to each area of said screen.

4. The lighting apparatus as set forth in claim 1, wherein the plurality of areas of the screen are areas divided in matrix form.

5. The lighting apparatus as set forth in claim 1, wherein the plurality of areas of the screen are areas divided in vertical direction.

6. A lighting apparatus for an image display apparatus comprising:
a plurality of light sources corresponding to a plurality of areas of a screen; and
a control unit configured to control a duty ratio of a turn-on period and a turn-off period of each light source by carrying out pulse width modulation control on the turn-on periods and the turn-off periods of said plurality of light sources according to an image signal to be inputted;
wherein in cases where the duty ratio of each light source is controlled according to the image signal to be inputted, said control unit adjusts turn-on timing of each light source in such a manner that a variation in the number of light sources which are in turn-on state at the same time is suppressed, and
in cases where there is a certain light source in which at least a part of a turn-on period for which a turn-on timing has been adjusted, and at least a part of a one previous turn-on period preceding said turn-on period overlap with each other because of adjustment of the turn-on timing of each light source, said control unit replaces the turn-on timing of said certain light source with a turn-on timing of a light source in which its duty ratio is equal to that of said certain light source or in which a difference between its duty ratio and the duty ratio of said certain light source is within a threshold value.

7. The lighting apparatus as set forth in claim 6, wherein said control unit controls the duty ratio of each light source according to an amount of brightness characteristic of an image corresponding to each area of said screen.

8. The lighting apparatus as set forth in claim 6, wherein the plurality of areas of the screen are areas divided in matrix form.

9. The lighting apparatus as set forth in claim 6, wherein the plurality of areas of the screen are areas divided in vertical direction.

10. A control method of a lighting apparatus for an image display apparatus which is provided with a plurality of light sources corresponding to a plurality of areas of a screen, said method comprising:
a step of inputting an image signal; and
a control step of controlling a duty ratio of a turn-on period and a turn-off period of each light source by carrying out pulse width modulation control on the turn-on periods and the turn-off periods of said plurality of light sources according to an image signal inputted;
wherein in said control step, in cases where the duty ratio of each light source is controlled according to the image signal inputted, turn-on timing of each light source is adjusted in such a manner that a variation in the number of light sources which are in turn-on state at the same time is suppressed, and
in said control step, said plurality of light sources are grouped in such a manner that light sources with their duty ratios being mutually equal to one another or with a difference between their duty ratios being within a threshold value belong to a same group, and turn-on timing of each light source is adjusted in such a manner that the turn-on timings of the light sources belonging to the same group are apart from one another.

11. The control method of a lighting apparatus as set forth in claim 10, wherein
in said control step, the turn-on timings of the individual light sources are adjusted by assigning a plurality of turn-on timings set in advance to the individual light sources, respectively, and the turn-on timings are assigned preferentially from a group of light sources with large duty ratios in such a manner that the turn-on timings of the light sources belonging to the same group are apart from one another.

12. The control method of a lighting apparatus as set forth in claim 10, wherein
in said control step, the duty ratio of each light source is controlled according to an amount of brightness characteristic of an image corresponding to each area of said screen.

13. The control method of a lighting apparatus as set forth in claim 10, wherein
the plurality of areas of the screen are areas divided in matrix form.

14. The control method of a lighting apparatus as set forth in claim 10, wherein
the plurality of areas of the screen are areas divided in vertical direction.

15. A control method of a lighting apparatus for an image display apparatus which is provided with a plurality of light sources corresponding to a plurality of areas of a screen, said method comprising:
a step of inputting an image signal; and
a control step of controlling a duty ratio of a turn-on period and a turn-off period of each light source by carrying out pulse width modulation control on the turn-on periods and the turn-off periods of said plurality of light sources according to an image signal inputted;
wherein in said control step, in cases where the duty ratio of each light source is controlled according to the image signal inputted, turn-on timing of each light source is adjusted in such a manner that a variation in the number of light sources which are in turn-on state at the same time is suppressed, and in said control step, in cases where there is a certain light source in which at least a part of a turn-on period for which a turn-on timing has been adjusted, and at least a part of a one previous turn-on period preceding said turn-on period overlap with each other because of adjustment of the turn-on timing of each light source, the turn-on timing of said certain light source is replaced with a turn-on timing of a light source in which its duty ratio is equal to that of said certain light source or in which a difference between its duty ratio and the duty ratio of said certain light source is within a threshold value.

16. The control method of a lighting apparatus as set forth in claim 15, wherein
in said control step, the duty ratio of each light source is controlled according to an amount of brightness characteristic of an image corresponding to each area of said screen.

17. The control method of a lighting apparatus as set forth in claim 15, wherein the plurality of areas of the screen are areas divided in matrix form.

18. The control method of a lighting apparatus as set forth in claim 15, wherein
the plurality of areas of the screen are areas divided in vertical direction.

19. A lighting apparatus for an image display apparatus comprising:
a plurality of light sources corresponding to a plurality of areas of a screen; and
a control unit configured to control a duty ratio of a turn-on period and a turn-off period of each light source by carrying out pulse width modulation control on the turn-on periods and the turn-off periods of said plurality of light sources according to an image signal to be inputted;
wherein in cases where the duty ratio of each light source is controlled according to the image signal to be inputted, said control unit divides said plurality of light sources into at least two groups based on their duty ratios, and said control unit adjusts turn-on timing of each light source in such a manner that a variation in the number of light sources, which are in turn-on state at the same time, in each group of the at least two groups is suppressed.

20. The lighting apparatus as set forth in claim 19, wherein said control unit preferentially adjusts turn-on timing of each light source in a group of light sources with large duty ratios in such a manner that a variation in the number of light sources, which are in turn-on state at the same time, in the group is to be suppressed.

21. The lighting apparatus as set forth in claim 19, wherein said control unit controls the duty ratio of each light source according to an amount of brightness characteristic of an image corresponding to each area of said screen.

22. The lighting apparatus as set forth in claim 19, wherein the plurality of areas of the screen are areas divided in matrix form.

23. The lighting apparatus as set forth in claim 19, wherein the plurality of areas of the screen are areas divided in vertical direction.

24. The lighting apparatus as set forth in claim 19, wherein said control unit adjusts turn-on timing of each light source in such a manner that the number of light sources, which are in turn-on state at the same time, in each group does not vary with a lapse of time.

25. The lighting apparatus as set forth in claim 19, wherein said control unit adjusts turn-on timing of each light source in such a manner that a variation in the number of light sources, which are in turn-on state at the same time, in each group of the at least two groups is suppressed by adjusting the turn on timings of the light sources belonging to a same group to be apart from one another.

26. The lighting apparatus as set forth in claim 19, wherein said control unit sets delay time of turn-on timing of the plurality of light sources in such a manner that the delay times of the plurality of light sources are different from each other.

* * * * *